(12) United States Patent
Bergman

(10) Patent No.: US 6,514,066 B1
(45) Date of Patent: Feb. 4, 2003

(54) DEVICE FOR HOT ISOSTATIC PRESSING

(75) Inventor: Carl Bergman, Surahammar (SE)

(73) Assignee: Flow Holdings GmbH (SAGL) Limited Liability Company (CH)

( * ) Notice: Subject to any disclaimer, the term of this patent is extended or adjusted under 35 U.S.C. 154(b) by 0 days.

(21) Appl. No.: 09/445,755

(22) PCT Filed: May 20, 1998

(86) PCT No.: PCT/SE98/00942
§ 371 (c)(1),
(2), (4) Date: Dec. 10, 1999

(87) PCT Pub. No.: WO98/56525
PCT Pub. Date: Dec. 17, 1998

(30) Foreign Application Priority Data

Jun. 13, 1997 (SE) .............................................. 9702255

(51) Int. Cl.⁷ ........................... B22F 3/15; B30B 15/34; B01J 3/04

(52) U.S. Cl. .................... 425/405.2; 219/400; 266/254; 432/199; 432/205

(58) Field of Search .............................. 425/73, 74, 78, 425/143, 405.2; 219/400; 266/252, 254; 419/49, 68; 432/199, 205, 233, 249

(56) References Cited

U.S. PATENT DOCUMENTS

| | | | |
|---|---|---|---|
| 4,217,087 A | 8/1980 | Bowles ........................ 425/78 |
| 4,349,333 A * | 9/1982 | Bowles ........................ 432/205 |
| 4,509,729 A | 4/1985 | Inoue ........................... 266/252 |
| 4,756,680 A * | 7/1988 | Ishii ............................ 425/78 |
| 5,123,832 A * | 6/1992 | Bergman et al. ........ 425/405.2 |
| 5,366,563 A | 11/1994 | Mckenzie ................... 148/216 |
| 5,366,689 A | 11/1994 | Säiner ......................... 419/49 |

FOREIGN PATENT DOCUMENTS

| | | |
|---|---|---|
| DE | 27 49 614 A1 | 5/1979 |
| EP | 0 395 884 A1 | 11/1990 |
| JP | 2-302587 | * 12/1990 |
| WO | WO 97/20652 | 6/1997 |
| WO | WO 98/51434 | 11/1998 |

* cited by examiner

Primary Examiner—James P. Mackey
(74) Attorney, Agent, or Firm—Seed Intellectual Property Law Group PLLC

(57) ABSTRACT

A device in hot isostatic pressing has first, second and third pumps. The first pump is adapted to pump a cooled pressure medium emanating from a cooling loop in the pressure vessel upwardly from a first space to a second pump which is arranged in a second space located above the first space but below a load space. The second pump is arranged to pump a mixture of the cooled pressure medium and a warm pressure medium emanating from the second space upwardly through the load space. The third pump is arranged in the second space to pump a warm pressure medium emanating from this space to the second pump for pumping the warm pressure medium by the second pump.

15 Claims, 1 Drawing Sheet

DEVICE FOR HOT ISOSTATIC PRESSING

BACKGROUND OF THE INVENTION

1. Field of the Invention

The present invention relates to a device for hot isostatic pressing. A device provided in accordance with one embodiment of the invention includes a pressure vessel having a wall, and a heat-insulating mantle surrounding a furnace chamber. The heat-insulating mantle is located within the pressure vessel walls with a first gap separating the heat-insulating mantle from the pressure vessel walls. The heat-insulating mantle is closed by a top member. The heat-insulating mantle contains a lower mantle opening and an upper mantle opening to the first gap such that a pressure medium enters a cooling loop in the first gap through the upper mantle opening and exits from the cooling loop through the lower mantle opening into the first space located below the furnace chamber.

A first guiding means is adapted to guide the pressure medium, which surrounds a load space in the furnace chamber adapted to receive loads to be pressed. The first guiding means has an upper discharge opening, and a lower entry opening, being arranged to define a second gap between the first guiding means and the heat-insulating mantle. The second gap permits the flow of the pressure medium upwardly through the interior of the load space. Upon the pressure medium reaching the top member of the heat-insulating mantle, the pressure medium is redirected to flow downward through the second gap to a second space located below the load space and above the first space.

The device is also provided with first and second pump means. The first pump means is adapted to pump a cooled pressure medium emanating from the cooling loop upwardly from the first space towards the second pump. The second pump means, which is arranged in the second space, is adapted to pump a mixture of the cooled pressure medium from the first pump means and a warm pressure medium emanating from the second gap upwardly through the load space.

2. Description of the Related Art

Hot isostatic pressing (HIP) is a technique being employed more frequently to press out "shrinkages" in castings through the combination of heat and high gas pressures within a furnace chamber. The HIP technique has been used on turbine blades for aircraft to substantially increase the strength and life of the blades. HIP is also used in manufacturing products made of compact material to minimize the porosity of the final product by pressurizing and heating the product simultaneously.

Typical pressures in hot isostatic pressing are 500 to 5,000 bars, while the temperature usually varies between 500 and 2,200° C. The HIP operating temperature is approximately 75% of the fusion temperature of the material being pressurized. An inert gas, such as argon, is usually used as a pressure medium.

In some systems, such as those described in U.S. Pat. No. 5,123,832 of the applicant, a first and second pump, such as ejectors (jet pumps), are driven for cooling loads present in the load space after the heating phase has been terminated. However, the present invention is not restricted to use of such a device for cooling purposes. Also, as will be discussed below, the pressure medium in the present invention may be a fluid or a gas, but for simplifying the description and for illuminating the object of the invention, the pressure medium will be described as a gas hereinafter.

While the '832 invention functions well, applicant believes it would be beneficial to control the cooling rate of the loads within the HIP device. To obtain preferred results from the hot isostatic pressing process, the cooling should proceed in a controlled manner and at a desired rate, i.e., the number of degrees Kelvin per minute. It is also important that the cooling takes place substantially homogeneously in the entire load space, such that each load acquires the same properties. The movement of the gases up through the load space is opposite to the direction of natural convection, since the gases entering the load space have a lower temperature than the loads and are gradually heated as the gases transition up through the load space. The driving mechanism for the gas to move through the load space and then circulate downward through the second gap is the impulse provided by the second pump means. The gas flow would completely stop if the first pump means, which drives the second pump means, were switched off for a short period. Consequently, defects in the properties of the loads would result. The flow of the first pump means and the impulse of the second pump means have to be regulated. Although it is possible to regulate the first and second pump means in steps, this regulation is not sufficiently precise and very inert, since it takes a considerable amount of time for the gases to make the transition through the load space after a change in the power of the first pump means. Furthermore, the impulse generated by the second pump means must be substantial enough to overcome the natural convection of the gases, so that the cooling rate may be regulated within a restricted interval.

BRIEF SUMMARY OF THE INVENTION

The object of the present invention is to provide a device, which more accurately regulates the temperature of the pressure medium pumped by the second pump means.

According to the present invention, a third pump means can be arranged in the second space to pump a warm pressure medium, emanating from the second gap, to the second pump means. A control unit can also be used to successively switch the first and third pump means on and off.

Utilizing the third pump means and the control unit to switch the first and third pump means on and off allows for more accurate temperature and pressure regulation of the pressure medium pumped by the second pump means through the load space. Thus, when the first pump means is switched off, and the third pump means is switched on, the warm pressure medium emanating from the second gap will be pumped through the second pump means upwards through the load space. In the case of cooling the loads, the cooling effect will be less efficient if only the first pump means is driven.

However, a good stirring and transporting of the pressure medium up through the load space is ensured by the ability of the second pump means to give the pressure medium a sufficient impulse through the third pump means. Thus, it is possible to accurately regulate the cooling effect by alternatingly switching the first and third pump means on and off through the control unit without disturbing the stirring of the pressure medium in the load space. Disturbing the stirring of the pressure medium within the load space may cause non-uniformities of the products pressed.

The cooling effect may be controlled by the length of the periods of time during which the respective pump means are switched on. However, the field of use of the present invention is not in any way restricted to cooling. It would also be possible to keep the first pump means switched off and the third pump means switched on during the entire or parts of the heating phase of the hot isostatic pressing. In this manner, a good stirring of the pressure medium and by that a good uniformity of the influence thereof upon the loads results in uniform properties of the loads independent of the location of the loads within the load space.

According to a preferred embodiment of the invention, the device is adapted to cool the loads after a terminated heating phase. The second pump means is adapted to pump a pressure medium from the second space upward through the load space. The pressure medium, upon leaving the second pump means, has a lower temperature than the temperature of the loads. Therefore, the cooling cycle occurs from heat transfer from the loads to the pressure medium as it moves up through the load space. The control unit is adapted to alternatingly switch the first and third pump means on and off, so that only one of them at a time is pumping the pressure medium to the second pump means. The temperature may therefore be accurately regulated without disturbing the stirring through the second pump means of the gas in the load space. The third pump means drives a warm pressure medium to the second pump means without giving any substantial cooling effect and whereas the first pump means drives a cooled pressure medium to the second pump means, therefore generating a greater cooling effect on the loads.

According to another embodiment of the invention, the control unit is adapted to keep the third pump means switched on and the first pump means switched off during the heating phase of the hot isostatic pressing for stirring the warm pressure medium. It may be possible to utilize the second pump means to ensure a good stirring of the pressure medium in the load space during the heating phase, such that the second pump means by this will have a broadened field of use and may contribute to improving the uniformity of the temperature upon the loads during the heating phase of the hot isostatic pressing.

According to another embodiment of invention, the pressure medium is an inert gas and the second pump means is a jet pump. The second pump means can be adapted to pump warm gases emanating from the second gap through jets from the first pump means and the third pump means. It is by this possible to draw in considerably larger flows of warm gas emanating from the second gap into the second pump means through comparatively small flows from the first and third pump means and bring these flows into circulation passing the loads, and downwardly in the second gap, so that a good stirring is obtained and the temperature difference between the gases passing the loads and the loads will not be too large.

According to another embodiment of the invention, the first pump means and the second pump means are jet pumps. The jet pumps are arranged to be driven through jets of gas, which emanate from a compressor arranged outside the pressure vessel. The gas from the compressor has a lower temperature than the warm gas from the second gap. The first and third pump means may advantageously be driven by such cold gases. Because the cooler gases from the first and third pump means have a temperature too low to allow them to directly contact the loads, the cooler gases are driven through the second pump means prior to entering the load space, The second pump means combines the cooler gases with warmer gases, the cooler gases constituting only a fraction of the total mass flow, such that the temperature of the gases entering the load space is acceptable. A thorough mixing of the flows emanating from the first and third pump means with the warm gas emanating from the second gap also occurs within the second pump means. In the instance when only the third pump means is switched on during the heating phase, the majority of the flowing gases delivered to the load space will be formed by the warm gases. In turn, these flowing warm gases will generate an even larger flow of warm gases from the second gap out of the second pump means and into the load space. Therefore, the cold gas introduced into the third pump means will not significantly influence the temperature of the gases entering the load space from the second pump means.

According to another embodiment of the invention, the first and third pump means are connected to the same compressor, and the control unit is arranged with a control valve at the outlet of the compressor. The control valve controls the flow of cold gas from the compressor to the first or third pump means. This simple and reliable arrangement indicates the ability of the device to readily regulate temperature. The desired practice is to have only the first pump means or the third pump means switched on at any given time; however, it is conceivable to have both pumps switched on at the same time. Furthermore, the use of only one compressor for both the first and third pumps simplifies the device and the control operation.

According to another embodiment of the invention, the device comprises a bottom plate arranged to separate the first and the second space. The bottom plate keeps the flow of the warm pressure medium from the second gap and the flow of the cooled pressure medium from the first gap from interacting with each other. A well-controlled regulation of the pressure medium is obtained through the second pump means by controlling the amounts of warm and cold pressure medium emanating from the third and the first pump means, respectively.

According to another embodiment of the invention, the third pump means is arranged in the bottom plate and has an outlet directed upward. Furthermore, the device comprises a second channel means extending from the second space into the bottom plate for the supply of the warm pressure medium emanating from the second gap to the third pump means. The bottom plate may be used to advantageously conduct the warm pressure medium into the third pump means for pumping it through the third pump means to the second pump means.

DETAILED DESCRIPTION OF THE INVENTION

Figure 1:
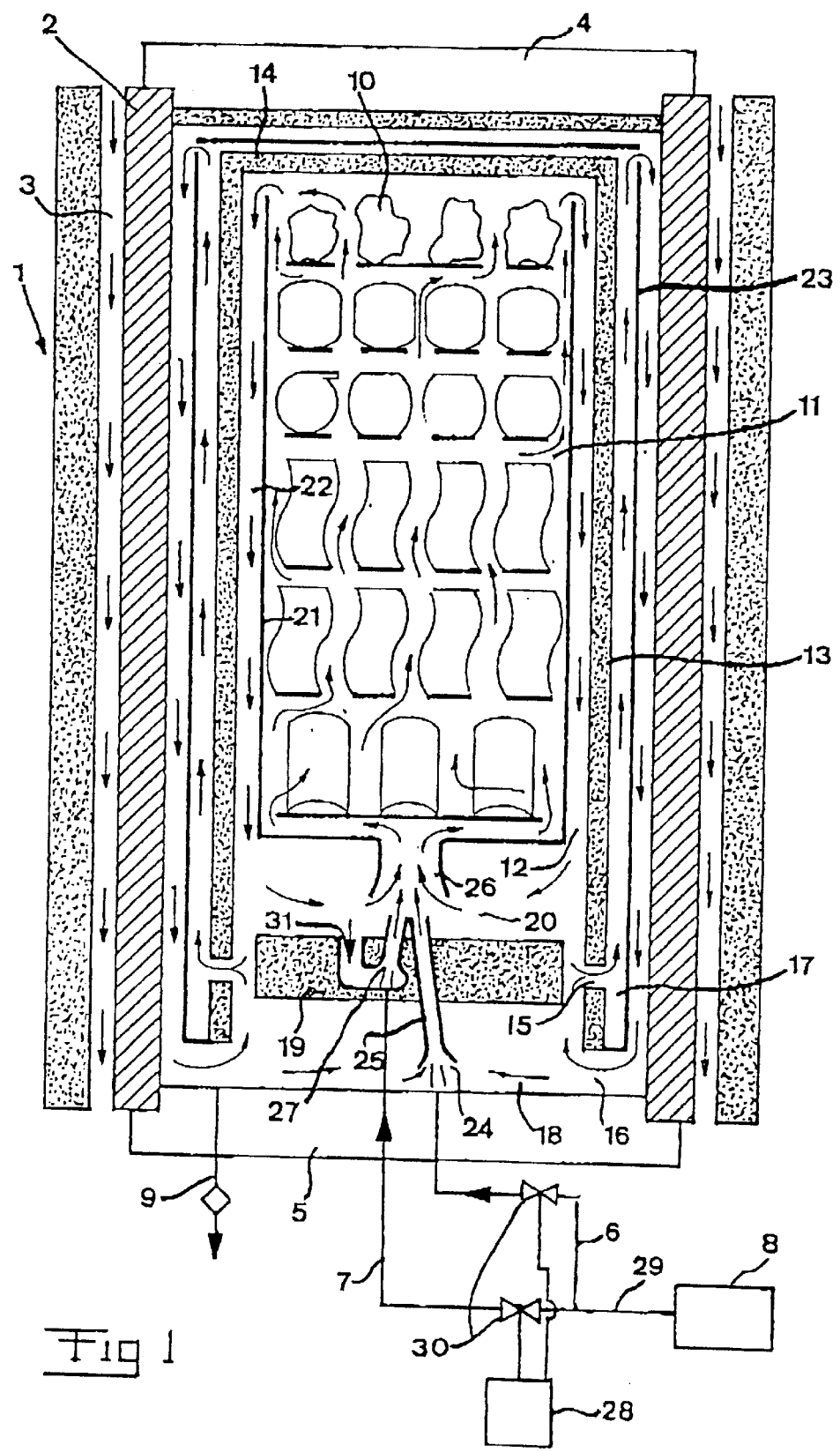
FIG. 1 is a sectional view illustrating a hot isostatic pressing device provided according to the present invention.

FIG. 1 illustrates a hot isostatic press device utilizing an inert gas, such as argon, as a pressure medium. The device is designed to rapidly cool the loads within the furnace chamber once the hot isostatic pressing process has been completed. Rapid cooling is required, for example, in the manufacture of Ni-base alloys. Rapid cooling can provide suitable material properties of these alloys without any further heat treatment operations, such as heating and quenching. Typical operating temperatures in a hot isostatic press are 1,000 to 1,400° C., and the loads should be cooled down to 600° C. at a cooling rate of 40 to 155° C./minute.

The device has a pressure vessel 1 with a wall 2, which is provided with means 3 for water cooling thereof. The upper part and the bottom of the pressure chamber are provided with closing means 4 and 5, respectively. The bottom closing means 5 is provided with through tubes 6 and 7 for the supply of gas from a joint compressor located outside the pressure vessel, which are routed through the pressure chamber bottom. Furthermore, a tube 9 is arranged for discharging gas from the pressure chamber. It is not desired to change the amount of gas inside the pressure chamber during rapid cooling of loads, so that the gas leaving the pressure chamber through tube 9 is recycled back to the compressor 8 for reentry into the chamber.

The loads 10, to be hot isostatically pressed, are placed in a load space 11 located in a furnace chamber 12. The furnace chamber is surrounded by a heat-insulating mantle 13, which is closed by a top member 14. The lower portion of the heat-insulating mantle 13 contains an upper mantle opening 15 and a lower mantle opening 16 open to a first gap 17. The first gap 17 resides between the pressure vessel wall 2 and the heat-insulating mantle 13 on two levels so as to allow pressure medium to enter into a cooling loop in this gap through the upper openings 15 and emerging from the cooling loop into a first space 18 located below the furnace chamber through the lower openings 16.

A heat-insulating bottom plate 19, which is arranged to separate the first space 18 from a second space 20 located above the bottom plate 19 but below the load space 11, delimits the furnace chamber 12. The bottom plate 19 is mounted separately at the bottom of the pressure chamber and is not tightly connected to the insulating mantle 13. A first guiding means 21, in the form of a basket, surrounds the load space 11 in the furnace chamber 12 and guides warm gas up through the load space 11. The warm gas flowing through the load space 11 exchanges heat with the loads 10, cooling the loads 10 and further warming the gas. The gas next flows down through a second gap 22 between the first guiding means 21 and the heat-insulating mantle 13. The warm gases leave the second gap below the first guiding means 21 into the second space 20.

A second guiding means 23 formed by a sleeve circulates the pressure medium in a cooling loop within the first gap 17. The gas circulates in an upward direction without contact with the pressure vessel wall and then the direction of gas flow is reversed downward in contact with the pressure vessel wall 2 to form the cooling loop. The upper section of the second guiding means contains an opening guiding the pressure medium downward between the second guiding means 23 and the pressure vessel wall 2.

The device is configured with a first pump means 24, in the form of a jet pump or ejector, which draws cold gas from the compressor 8 through the conduit 6. The first pump means 24 is located in the first space 18. The function of the first pump is to give cooled gas emanating from the cooling loop in the first gap 17 an impulse and by that pump it into a first channel means 25 leading through the bottom plate 19 to a second pump means 26 located in the second space 20. The proportional makeup of the gas flowing through the first channel 25 constitutes gas emanating from the first space 18 and cold gas from the compressor 8. Only about one fifth of the total gas flowing through the first channel 25 will consist of the cold gas from the compressor 8.

The gas flow exiting the first channel 25 drives the second pump means 26. The second pump means 26 may also be a jet pump or ejector. The warm gases emanating from the second gap 22 receive an impulse by the first pump means 24, the magnitude of the impulse is proportional to the mass and speed of the gas. The gas exiting the first pump means 24 is sufficiently mixed with the other temperature gases within the second space 20, such that the mixture is well stirred and at a somewhat lower temperature before being pumped into the load space by the second pump means 26.

A third pump means 27 is arranged to receive cold gas from the compressor 8 through the conduit 7 and function as a jet pump or ejector. The third pump means 27 gives the warm gases emanating from the second gap 22 an impulse in the direction toward the second pump means 26. The third pump means 27 is positioned in the bottom plate 19. The bottom plate 19 contains a second channel 31 for conducting warm gases from the second space 20 to the third pump means 27.

A control unit 28 contains a two-way control valve 30 connected in parallel and positioned at the outlet 29 of the compressor 8. The control valve 30 directs the cold gas from the compressor 8 either to the first pump means 24 or to the third pump means 27. The two-way control valve 30 provides that one of the valves is always kept open and the other closed. Alternatively, a single, three-way valve is possible, however, the current technology three-way valves cannot withstand the pressures within the hot isostatic press device.

The overall function of the hot isostatic press device provided in accordance with the present invention is to pressurize and heat the loads 10 and then rapidly cool the loads. Once the heating phase of the hot isostatic pressing has been terminated, it is desirable to rapidly and uniformly cool the loads 10. The control unit 28 controls the valve 30 to successively alternate between the first pump means 24 and the third pump means 27. The successive cycling between the first and third pump means forces the resulting mass of gas to drive the second pump means. When the control unit has only the first pump means 24 switched on, the gas jet driving the second pump means 26 is primarily cooled gas emanating from the cooling loop via the lower mantle opening 16. The second pump means 26 also draws warm gas from the second gap 22, such that cool and warm gases are well mixed as the gas flows up into the load space 11.

The temperature of the gas entering the load space is somewhat lower than the temperature of the loads. The lower temperature gas draws heat from the loads in the load space. Because the gas coming from the second space 20 is at a lower temperature than the temperature than the load space, to the low temperature gas must be pumped through the second pump means 26 against the direction of the natural convection. Some of the warm gases entering the second space 20 from the second gap 22 are drawn into the second pump means 26, while a part will exit through the heat-insulating mantle 13 via the upper mantle opening 15 and then circulate. The gases entering the heat-insulating mantle 13 are circulated in the cooling loop formed by the second guiding means 23. Through natural convection, the cooled gases emerge from the first gap 17 into the first space 18 via the lower mantle opening 16. Some of the cooled gas from the lower mantle opening 16 reenters the cooling loop through the upper mantle opening 15, while the remainder of the cooled gas from the lower mantle opening 16 flows to the first pump means 24.

The control valve 30, controlled by the control unit 28, connects the third pump means 27 to the compressor 8 through the conduit 7. These cold gases from the compressor 8 into the third pump means 27 provide an impulse to the warm gases in the first space exiting from the second channel 25. The impulse drives the combined gases up toward the second pump means 26 and form the jet driving it, which in its turn gives warm gases from the second gap 22 in the second pump means 26 an impulse upwardly, so that a stirring is obtained. The result of combining the various temperature gases is a substantially homogenous gas mixture with a uniform temperature being only slightly lower than the temperature of the loads. The third pump means, during the heating phase, may be operated alone to drive the second pump means 26 for good stirring of the warm gases passing the loads. Heating elements not shown in the drawing, arranged along the heat-insulating mantle 13, can compensate, if needed, for the somewhat lower temperature of the gases received by the third pump means 27.

The control unit 28 may successively alternate the control valve 30 to switch on either the first pump means or the third pump means during short time intervals as the loads 10 are cooled rapidly. Utilizing the control valve 30 in this manner permits an accurate regulation of the gas temperature without disturbing the gas within the load space 11.

The invention is not in any way restricted to the embodiments described above, but many possibilities and modifications may be apparent to a person skilled in the art, without departing from the basic concepts of the claimed invention.

For example, it may be possible to use a pressure medium other than gas, such as oil. A hot isostatic press with a pressure medium of oil may be used for manufacturing explosives.

It may also be possible to bring the outlets of the two channels (25 and 31) from the first 24 and third pump means 27 together to form a common channel directed into the second pump means 26.

Furthermore, the device may have more than one first 24 and third 27 pump means.

Third pump means 27 is to be given the meaning that it also comprises the case in which no pump means is present. For example, the pressure medium jet coming from the compressor 8 is fed directly into the second pump means 26 through the conduit 7. This jet is considered to form the third pump means. However, it is advantageous to arrange the nozzle of the third pump means 27 further below, as shown in FIG. 1, for protection.

What is claimed is:

1. A device for hot isostatic pressing comprising:

a pressure vessel having a wall;

a heat-insulating mantle surrounding a furnace chamber and arranged internally of the wall with a first gap between the heat-insulating mantle and the wall, the heating insulating mantle being closed with a top member and provided with a lower opening and an upper opening to the first gap so as to allow pressure medium to enter a cooling loop in the first gap through the upper opening and emerge from the cooling loop through the lower opening into a first space located below the furnace chamber;

a first guiding means adapted to guide the pressure medium and which surrounds a load space in the furnace chamber adapted to receive loads to be pressed, the first guiding means having an upper discharge opening and, a lower entry opening being arranged to define a second gap, between the first guiding means and the heat-insulating mantle such that the pressure medium flows upwardly within the load space to an upper region of the heat-insulating mantle and the pressure medium then moves downward through the second gap to a second space located below the load space and above the first space;

a first and a second pump means, the first pump means being adapted to pump a cooled pressure medium emanating from the cooling loop upwardly from the first space to the second pump means, which is arranged in the second space to pump a mixture of the cooled pressure medium from the first pump means and a warm pressure medium emanating from the second gap upwardly through the load space;

a third pump means arranged in the second space to pump the warm pressure medium emanating from the second gap to the second pump means; and a control unit adapted to optionally switch the first and third pump means on and off.

2. A device according to claim 1, wherein the second pump means is adapted to pump the pressure medium from the second space upwardly in the load space such that the temperature of the pressure medium within the load space decreases at a desired rate.

3. A device according to claim 1, wherein the control unit is adapted to keep the third pump means switched on and the first pump means switched off during the heating phase of the hot isostatic pressing for stirring the warm pressure medium.

4. A device according to claim 1, wherein the pressure medium is an inert gas.

5. A device according to claim 1, wherein the second pump means is a jet pump adapted to be driven to pump the warm pressure medium emanating from the second gap through a plurality of jets from the first pump means.

6. A device according to claim 1 or 5, wherein the first pump means and the third pump means are jet pumps.

7. A device according to claim 1, wherein the first and the third pump means are connected to a compressor, and the control unit is arranged to control a valve coupled to an outlet of the compressor for controlling the flow of cold gas from the compressor to the first or the third pump means.

8. A device according to claims 1 or 7, wherein a bottom plate is arranged to separate the first and the second space and by that to separate the flow of the warm pressure medium from the second gap and the cooled pressure medium from the first gap.

9. A device according to claim 8, wherein the bottom plate is made of a heat-insulating material.

10. A device according to claim 8, wherein a flow opening arranged between the heat-insulating mantle and the bottom plate permits the flow of the pressure medium between the first and the second spaces.

11. A device according to claim 8, wherein a first channel is arranged to conduct the pressure medium from the first pump means through the bottom plate to the second pump means.

12. A device according to claim 8, wherein the third pump means is arranged in the bottom plate.

13. A device according to claim 8, wherein a second channel extends from the second space into the bottom plate to supply the warm pressure medium emanating from the second gap to the third pump means.

14. A device according to claim 1, further comprising:

a second guiding means for circulating the pressure medium through the cooling loop in the first gap, such that the pressure medium flows up without any contact with the pressure vessel wall and then flows down in contact with the pressure vessel wall, the second guiding means also having an upper circulation opening for reversing the flow direction of the pressure medium in the first gap to flow downward between the second guiding means and the pressure vessel wall.

15. A device according to claim 1, wherein the lower opening of the heat-insulating mantle and the first pump means are proximally located such that some of the cooled pressure medium entering into the first space from the first gap reenters the cooling loop through the upper opening in the heat-insulating mantle.

* * * * *

UNITED STATES PATENT AND TRADEMARK OFFICE
CERTIFICATE OF CORRECTION

PATENT NO.    : 6,514,066 B1  Page 1 of 1
DATED         : February 4, 2003
INVENTOR(S)   : Carl Bergman It is certified that error appears in the above-identified patent and that said Letters Patent is hereby corrected as shown below:

<u>Title page,</u>
Item [86], "December 10, 1999," should read -- July 7, 2000 --.

Signed and Sealed this

Twenty-ninth Day of July, 2003

JAMES E. ROGAN
*Director of the United States Patent and Trademark Office*